(12) United States Patent
MacDougall

(10) Patent No.: US 12,396,589 B1
(45) Date of Patent: Aug. 26, 2025

(54) PORTABLE COOKING DEVICE

(71) Applicant: Alan Robert MacDougall, Beaverton, OR (US)

(72) Inventor: Alan Robert MacDougall, Beaverton, OR (US)

( * ) Notice: Subject to any disclaimer, the term of this patent is extended or adjusted under 35 U.S.C. 154(b) by 350 days.

(21) Appl. No.: 18/086,731

(22) Filed: Dec. 22, 2022

Related U.S. Application Data

(60) Provisional application No. 63/308,411, filed on Feb. 9, 2022.

(51) Int. Cl.
*A47J 33/00* (2006.01)
*A47J 36/06* (2006.01)
*F24C 3/14* (2021.01)

(52) U.S. Cl.
CPC ............... *A47J 33/00* (2013.01); *A47J 36/06* (2013.01); *F24C 3/14* (2013.01)

(58) Field of Classification Search
CPC .............. A47J 33/00; A47J 36/06; F24C 3/14
See application file for complete search history.

(56) References Cited

U.S. PATENT DOCUMENTS

| 3,933,146 | A | * | 1/1976 | Hastings | F24C 3/047 |
| | | | | | 126/38 |
| 4,082,993 | A | * | 4/1978 | Oakes | F17C 13/04 |
| | | | | | 222/3 |
| 4,628,895 | A | * | 12/1986 | Santilli | F24C 3/14 |
| | | | | | 432/158 |
| 5,195,500 | A | * | 3/1993 | Lerner | F24C 1/10 |
| | | | | | 126/29 |
| 5,413,087 | A | * | 5/1995 | Jean | F24C 3/02 |
| | | | | | 126/41 R |
| 2013/0276643 | A1 | * | 10/2013 | Krolick | F24B 1/003 |
| | | | | | 99/447 |
| 2014/0026881 | A1 | * | 1/2014 | Abrams | A47J 37/0658 |
| | | | | | 126/25 R |

FOREIGN PATENT DOCUMENTS

WO WO-0009950 A1 * 2/2000 .......... A47J 37/0713

* cited by examiner

*Primary Examiner* — Alfred Basichas
(74) *Attorney, Agent, or Firm* — Plager Schack LLP; Mark H. Plager; Kara K. Verryt

(57) ABSTRACT

A portable cooking device for cooking food while backpacking or camping may include a cooktop frame having an outer support frame with a polygonal outer edge; a center orifice extending through the outer support frame; and at least a pair of support crossbars extending across a diameter of the center orifice from a first portion of an inner edge of the outer frame to a second portion of the inner edge of the outer frame, such that the pair of support crossbars intersect to partition the center orifice into a plurality of heat transfer openings.

11 Claims, 3 Drawing Sheets

PORTABLE COOKING DEVICE

RELATED APPLICATION

This application claims priority to provisional patent application U.S. Ser. No. 63/308,411 filed on Feb. 9, 2022, the entire contents of which is herein incorporated by reference.

BACKGROUND

The embodiments described herein relate generally to cooking accessories and, more particularly, to a portable cooking device.

Making pizza, quesadillas, and other similar meals is typically not performed while backpacking or camping, because there are no lightweight and easily packable devices designed to sufficiently and thoroughly cook such foods. While many backpackers, campers, and outdoorspeople will use a pan for cooking, pans only cook from the bottom surface As a result, pizza and similar foods cooked on pans will be undercooked on the top side and have a high probability of being overcooked or burnt on the bottom side. Existing oven style devices are too bulky and heavy to carry while backpacking.

Therefore, what is needed is cooking device that is lightweight, portable, and provides a safe and easy way to cook and handle pizza, quesadillas, and the like.

SUMMARY

Some embodiments of the present disclosure include a portable cooking device for cooking food while backpacking or camping. The portable cooking device may include a cooktop frame having an outer support frame with a polygonal outer edge; a center orifice extending through the outer support frame; and at least a pair of support crossbars extending across a diameter of the center orifice from a first portion of an inner edge of the outer frame to a second portion of the inner edge of the outer frame, such that the pair of support crossbars intersect to partition the center orifice into a plurality of heat transfer openings.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
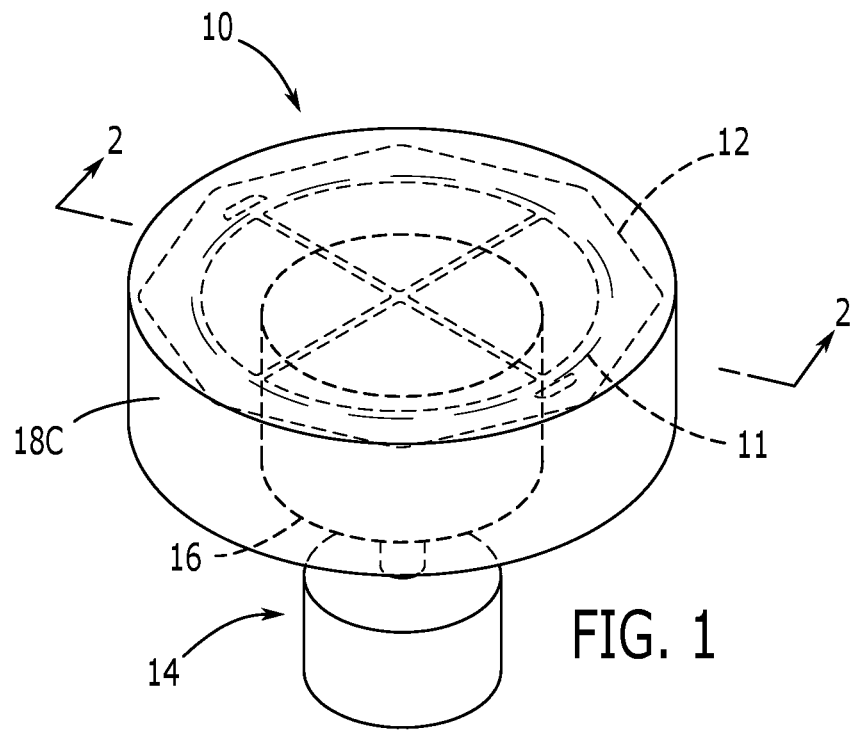
FIG. 1 is a front perspective view of one embodiment of the current disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a portable cooking device and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-5, some embodiments of the present disclosure include a portable cooking device 10 for cooking food, such as pizza, quesadillas, and the like while backpacking, camping, etc., the portable cooking device 10 comprising a cooktop frame 12 comprising an outer support frame 12A with outer edges 12E, a center orifice extending through the outer support frame, and at least a pair of support crossbars 12B extending across a diameter of the center orifice from a first portion of an inner edge of the outer frame 12A to a second portion of the inner edge of the outer frame 12A, such that the pair of support crossbars 12B intersect to partition the center orifice into a plurality of heat transfer openings 12C. The cooktop frame 12 may further comprise at least one handle insert orifice 12D extending through the outer support frame 12A, wherein the at least one hand insert orifice 12D is sized to accommodate a removal device, such as a handle, tong, or the like, therein to lift the cooktop frame 12.

In particular embodiment, and as shown in the Figures, the cooktop frame 12 may be substantially octagonal in shape. However, other polygonal shapes are envisioned. As shown in the Figures, the center orifice may be substantially circular in shape. However, in other embodiments, the shape of the center orifice may be similar to that of the outer support frame 12A. As mentioned above, at least a pair of support crossbars 12B may partition the center orifice. More specifically, the pair of support crossbars 12B may be substantially perpendicular to one another, intersecting at a point that is concentric with the cooktop frame 12, thus dividing the center orifice into 4 equally shaped and spaced heat transfer orifices 12C. In alternate embodiments, a varying number of crossbar supports 12B may divide the center orifice. However, it may be beneficial or desirable to have the crossbar supports 12B arranged such that the center orifice is divided into equally sized heat transfer orifices 12C. As described above, the cooktop frame 12 may have at least one handle insert orifice 12D extending therethrough. In a particular embodiment, the cooktop frame 12 may have two handle insert orifices 12D extending therethrough, wherein the handle insert orifices 12D are positioned opposite one another on the cooktop frame 12.

The portable cooking device 10 of the present disclosure may be made of any suitable materials and, in some embodiments, may be made from, for example, stainless steel, aluminum, titanium, or the like. The cooktop frame 12 may be made from a plate that is cut using laser, water jet, die stamping, or other conventional known methods. As shown in the Figures, the cooktop frame 12 may be substantially planar, thin, and lightweight. In some embodiments, the cooktop frame 12 may weigh about 4 ounces.

Figure 2:
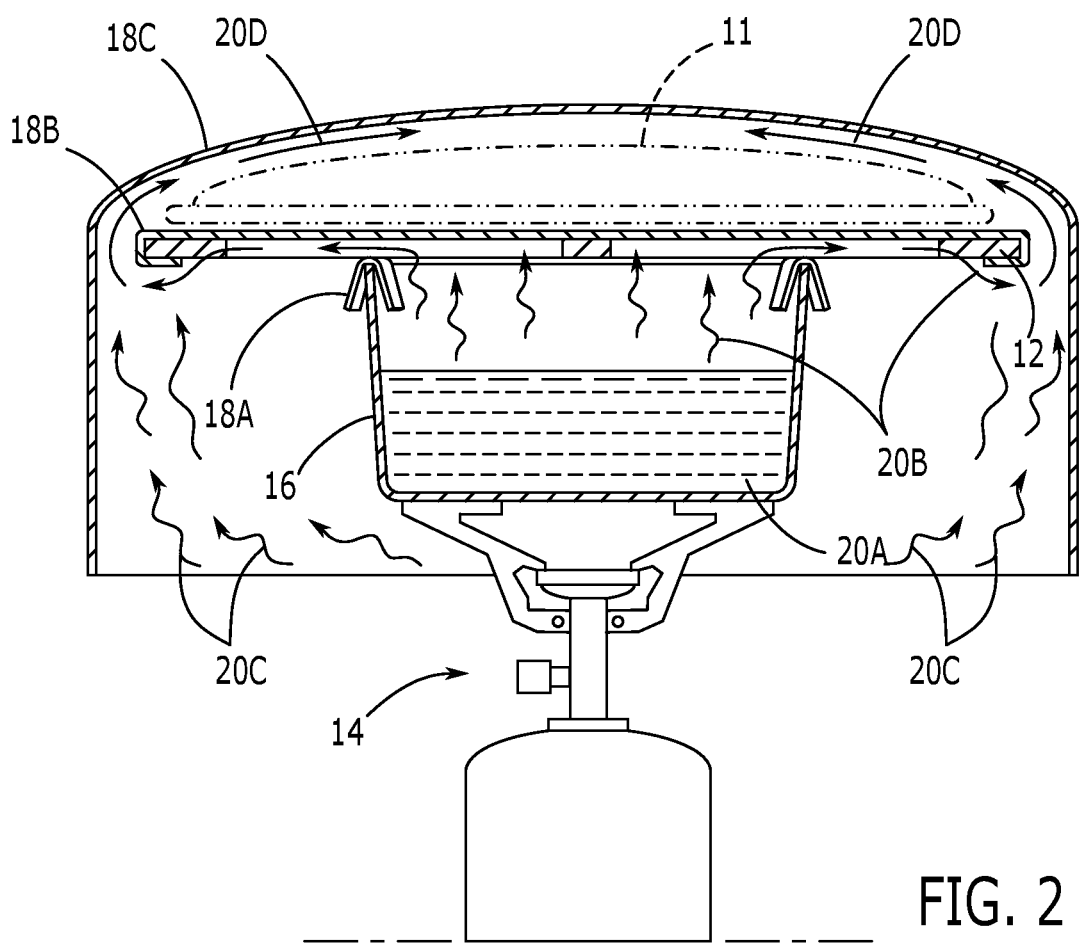
FIG. 2 is a section view of one embodiment of the present disclosure, taken along line 2-2 in FIG. 1.
Figure 3:
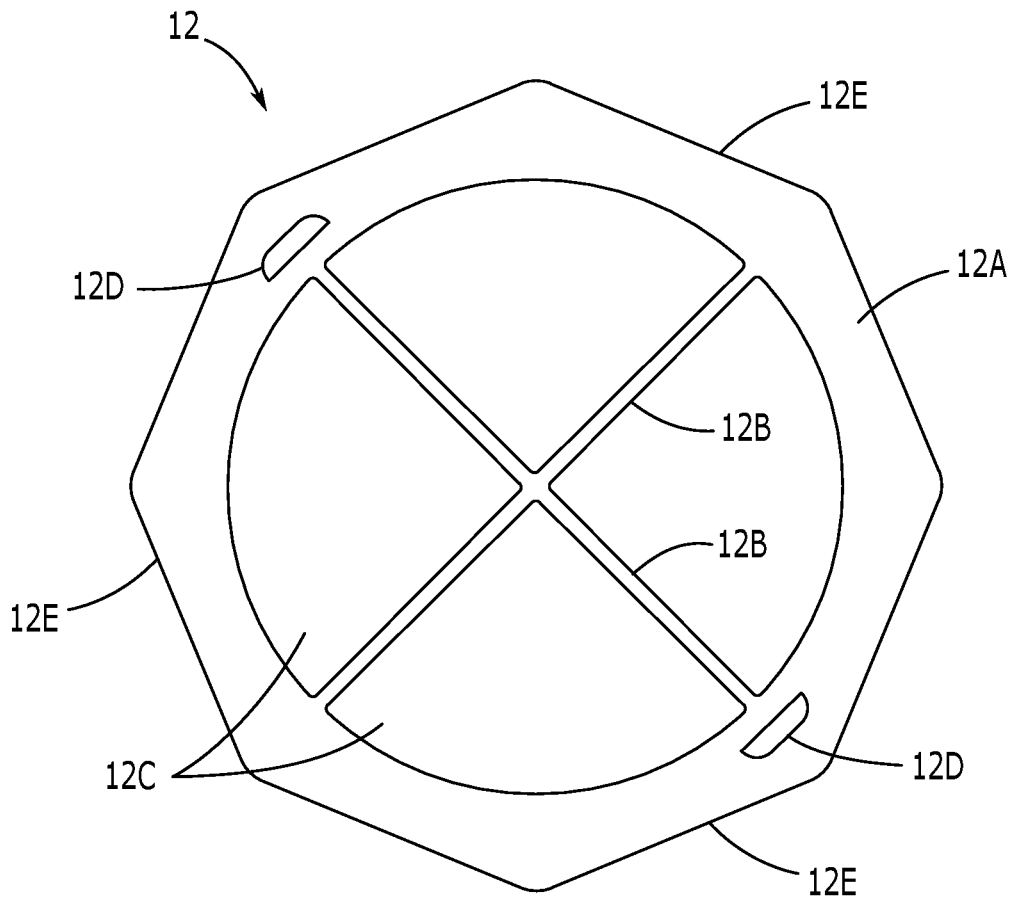
FIG. 3 is a top view of one embodiment of the present disclosure.
Figure 4:
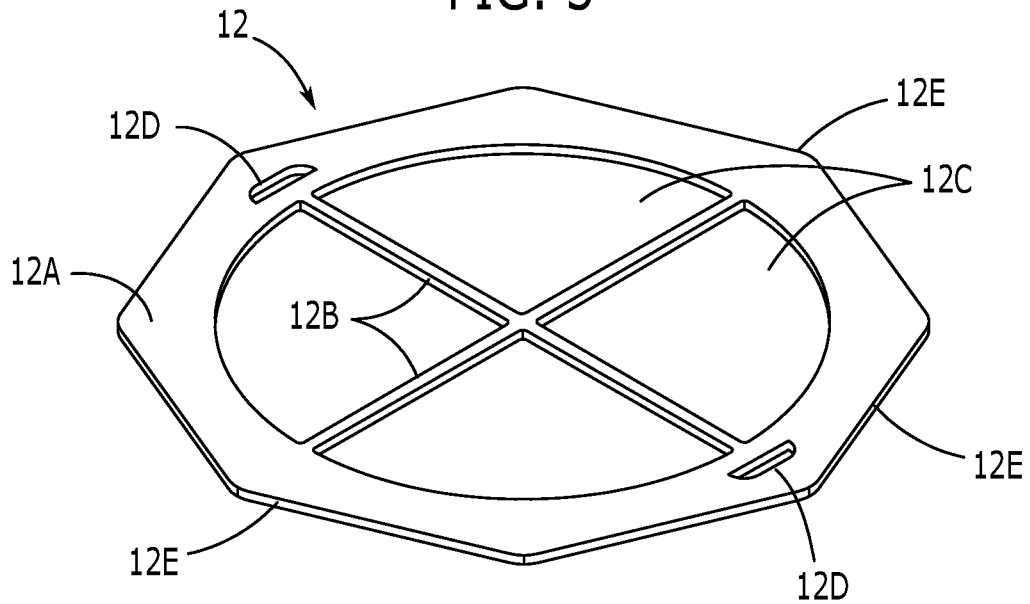
FIG. 4 is a perspective view of one embodiment of the present disclosure.
Figure 5:
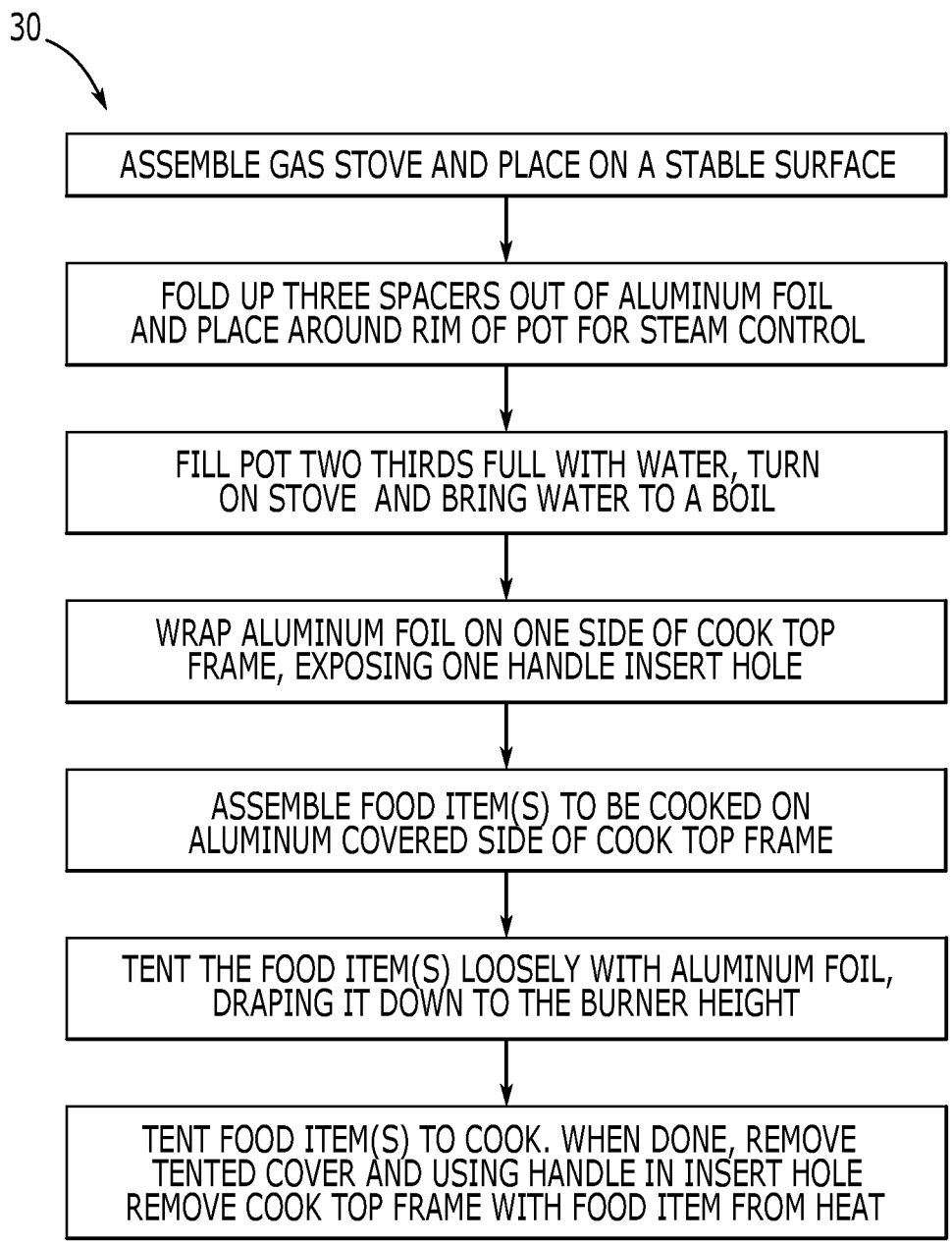
FIG. 5 is a flowchart describing a cooking process using one embodiment of the present disclosure.

In embodiments, and as described in FIG. 5 and as shown in FIGS. 1 and 2, a method 30 for using the portable cooking device 10 of the present disclosure may comprise assembling a conventional gas stove 14 on a surface, such as a flat and horizontal surface. A pot 16 with a volume of water 20A, such as a pot 16 filled ⅔ with water 20A, may be positioned on the burner of the gas stove 14. A plurality of spacers 18A, such as at least three spacers 18A, may be created by folding up aluminum foil. The spacers 18A may then be positioned around, such as equidistantly around, the rim of the pot 16. During use, the spacers 18A may provide for steam control. Aluminum foil may be wrapped over one side of the cooktop frame 12, forming an aluminum cooking surface 18B leaving at least one of the handle insert orifices 12D exposed. The cooktop frame 12 may be placed on top of the rim of the pot 16 with the aluminum cooking surface 18B facing up (i.e., away from the pot 16). The desired food item(s) 11 may be placed onto the aluminum cooking surface 18B, and an aluminum tent 18C may be assembled and draped loosely over the food items 11 and down to burner height, thus tenting the food items 11 for cooking. The gas burner 14 may be lit or otherwise turned on, allowing burner heat 20C and steam heat 20B to cook the bottom of the food item 11 and a combination steam/burner heat 20D to circulate within the aluminum tent 18C to cook the food 11 from the top and side. When cooking is completed, the aluminum tent 18C may be removed and the cooktop frame 12 may be removed from the pot 16 using handles inserted into the handle insert orifices 12D. Due to the structure of the cooktop frame 12 along with following the above method of use, the food items 11 may be thoroughly and evenly cooked.

While the above describes using the portable cooking device 10 with a pot 16 and an aluminum tent 18C, it is not limited to such use. Rather, it may also be used as a pan cover, as a grill on a heat source, or other cooking device.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A portable cooking device for cooking food, the portable cooking device comprising:
    a cooktop frame comprising:
        an outer support frame with a polygonal outer edge, which allows for space between the polygonal outer edge and a cover placed thereon to allow for indirect heating;
        a center orifice extending through the outer support frame; and
        at least a pair of support crossbars extending across a diameter of the center orifice from a first portion of an inner edge of the outer frame to a second portion of the inner edge of the outer frame, such that the pair of support crossbars intersect to partition the center orifice into a plurality of heat transfer openings.

2. The portable cooking device of claim 1, further comprising at least one handle insert orifice extending through the outer support frame, wherein the at least one hand insert orifice is sized to accommodate a removal device therein.

3. The portable cooking device of claim 1, wherein the cooktop frame is octagonal.

4. The portable cooking device of claim 1, wherein the plurality of heat transfer openings are identical in size and shape.

5. The portable cooking device of claim 1, wherein the cooktop frame comprises a material comprising a member selected from the group consisting of stainless steel, aluminum, and titanium.

6. The portable cooking device of claim 1, further comprising:
    a heating element;
    a pot configured to rest upon the heating element;
    a plurality of spacers configured to rest upon a rim of the pot, wherein the cooktop frame is configured to rest upon the plurality of spacers; and
    an aluminum tent configured to be placed over the cooktop frame and to drape downward to the heating element.

7. The portable cooking device of claim 6, wherein an aluminum cooking surface is wrapped around an outer edge of the cooktop frame.

8. The portable cooking device of claim 1, further comprising an aluminum cooking surface positioned on a top surface of the cooktop frame.

9. The portable cooking device of claim 1, wherein the cooktop frame is a planar, unitary member.

10. A portable cooking device for cooking food, the portable cooking device comprising:
    a cooktop frame comprising:
        an outer support frame with a polygonal outer edge;
        a center orifice extending through the outer support frame; and
        at least a pair of support crossbars extending across a diameter of the center orifice from a first portion of an inner edge of the outer frame to a second portion of the inner edge of the outer frame, such that the pair of support crossbars intersect to partition the center orifice into a plurality of heat transfer openings;
    a heating element;
    a pot configured to rest upon the heating element;
    a plurality of spacers configured to rest upon a rim of the pot, wherein the cooktop frame is configured to rest upon the plurality of spacers;
    an aluminum tent configured to be placed over the cooktop frame and to drape downward to the heating element; and
    an aluminum cooking surface positioned on a top surface of and wrapped around an outer edge of the cooktop frame.

11. A portable cooking device for cooking food, the portable cooking device comprising:
    a cooktop frame comprising:
        an outer support frame with a polygonal outer edge;
        a center orifice extending through the outer support frame; and
        at least a pair of support crossbars extending across a diameter of the center orifice from a first portion of an inner edge of the outer frame to a second portion of the inner edge of the outer frame, such that the pair of support crossbars intersect to partition the center orifice into a plurality of heat transfer openings; and
    an aluminum cooking surface positioned on a top surface of and wrapped around an outer edge of the cooktop frame.

* * * * *